UNITED STATES PATENT OFFICE.

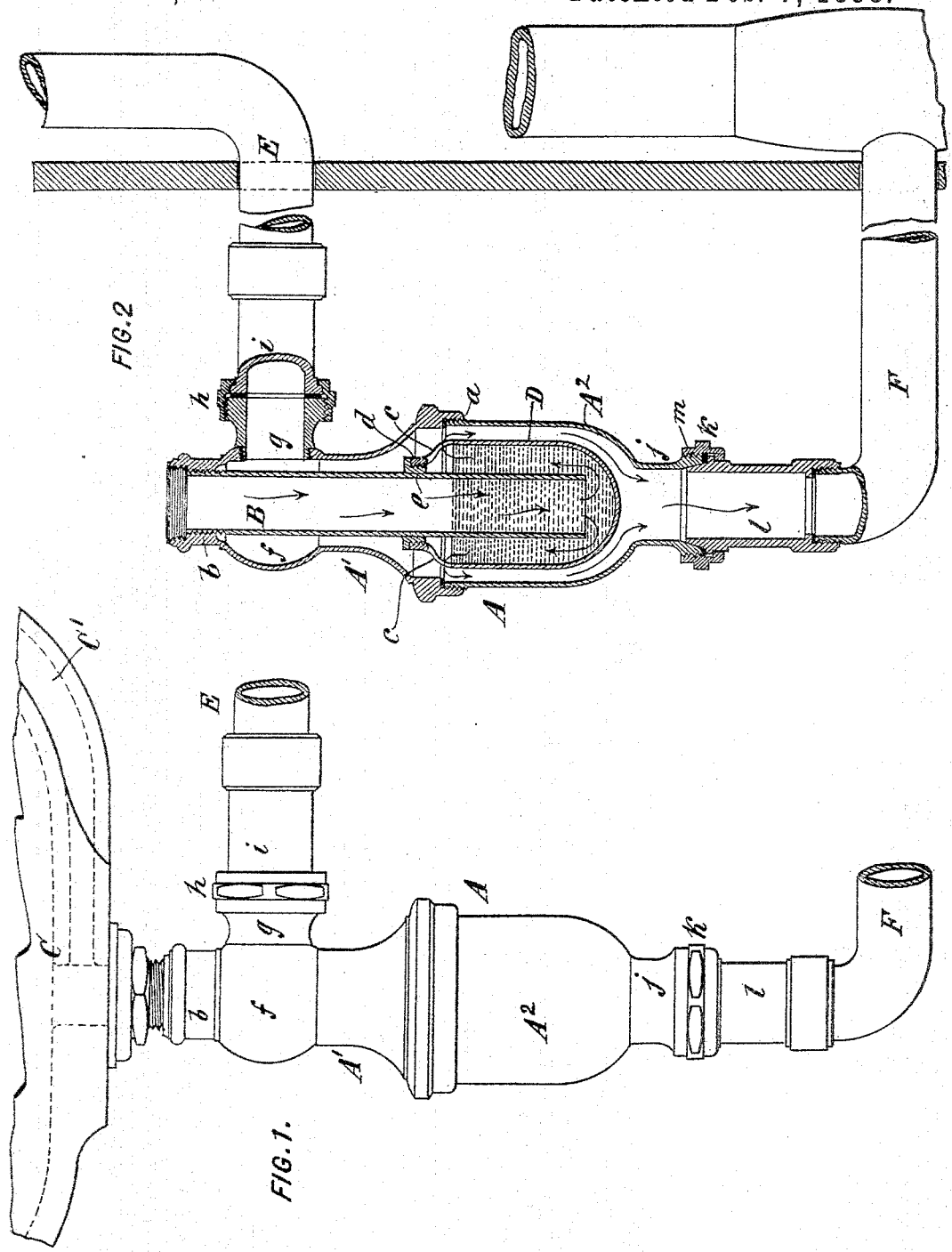

THOMAS C. BEAUMONT, OF NEW YORK, N. Y., ASSIGNOR TO THE HENRY HUBER COMPANY, OF SAME PLACE.

STENCH-TRAP.

SPECIFICATION forming part of Letters Patent No. 491,330, dated February 7, 1893.

Application filed June 10, 1892. Serial No. 436,186. (No model.)

*To all whom it may concern:*

Be it known that I, THOMAS C. BEAUMONT, a citizen of the United States, residing in the city, county, and State of New York, have invented certain new and useful Improvements in Stench-Traps, of which the following is a specification.

This invention aims to provide an improved construction of plumbers' traps applicable to wash basins, urinals, &c.

Figure 1 of the accompanying drawings is an elevation of my improved trap showing it applied beneath a wash basin; Fig. 2 is a vertical mid-section of the trap showing the waste and back-air pipes connected thereto.

My improved trap is constructed with an outer shell A, the lower portion of which is expanded to form a trap chamber, the shell being made in two parts or sections lettered A' and A² respectively, and which are united at said expanded portion in such manner as to be separable by screwing them together as shown at $a$ in Fig. 2. The upper section A' of the shell is extended upwardly from the junction and formed with a neck $b$ through which passes the outlet pipe B leading from the wash basin C or other device to which the trap is applied. The pipe B is fastened in the neck $b$ preferably by screwing it thereinto as shown in Fig. 2, and it extends down through the section A' of the shell, and to nearly the lower end of the expanded portion of the shell. Around its lower end is hung a cup D for containing water, in which the lower end of the pipe B is sealed. The cup D is mounted concentrically within the chamber or expanded portion of the shell A, the latter conforming somewhat closely to it as shown. Thus an annular water space is left between the pipe B and the cup, and another annular space between the cup and the shell A². The cup is mounted and supported by being constructed with arms $c\ c$ joining it to a ring $d$, which is screwthreaded and screws on a threaded boss $e$ formed on the pipe B. Thus the cup is hung from this pipe, but in such manner as to avoid the necessity of making the pipe B in sections, the pipe being integral from end to end.

The upper portion of the shell section A' is preferably expanded at $f$, and has projecting from it a tubular arm or branch $g$, to which is applied an ordinary pipe connection or union $h$ for connecting the back-air pipe E, which leads to the roof or a ventilating flue for ventilating the trap in the usual manner. The connection $h$ consists of an ordinary union-nut joining a tubular thimble or stud $i$ to the branch $g$. The lower end of the shell is contracted to form a neck $j$, to which is applied a pipe connection $k$ for joining the waste pipe F to the shell. This pipe F is united by screwthreads or in any other suitable manner to a thimble or spud $l$ which is joined to the neck $j$ by the union $k$. The end of the spud $l$ is externally coned and ground into the internally coned end of the neck $j$, as shown at $m$ in Fig. 2, whereby upon screwing up the union or thimble $k$ of the pipe connection, a tight joint is formed without the employment of any packing.

In putting my trap together, the pipe B is screwed into the section A', and the cup D is screwed onto the pipe B, after which the section A² is screwed onto the section A'. In applying the trap, the usual waste and back-air pipes are set, and the back-air and waste connection thimbles $i$ and $l$ are joined to them, and the trap is applied by screwing or otherwise uniting the neck $b$ of the shell to the outlet from the basin or other structure, after which the back-air and waste connections are screwed up to join these pipes to the trap.

The construction of my trap is such that it presents a very sightly appearance, and is especially adapted for the better class of plumbing, where the traps and other fittings are left exposed to view. The parts of the trap are easily taken apart and put together, and the mechanical construction of the trap is very simple. The trap is easily disconnected and opened for cleaning, although its construction is such that it is not liable to clog, and hence will rarely require to be cleaned out.

The pipe B receives both the main discharge and the overflow from the basin or other structure. In the drawings the basin C is assumed to be of that construction wherein the overflow passage lettered C' is formed integrally with the basin.

I claim as my invention the following defined novel features substantially as hereinbefore specified, namely:—

The combination of an outer shell A expanded at its lower portion and made in two sections A' and A² separably united at its expanded portion, an outlet pipe B fastened in the upper section and extending down within the lower section of the shell, a cup D inclosing the lower part of said pipe formed with arms c, and ring d screwing on said pipe, a back-air connection formed on the upper part of said shell, and a waste connection formed at the lower end of said shell.

In witness whereof I have hereunto signed my name in the presence of two subscribing witnesses.

THOMAS C. BEAUMONT.

Witnesses:
 GEORGE H. FRASER,
 CHARLES K. FRASER.